(12) United States Patent
Kletzli et al.

(10) Patent No.: US 11,533,903 B2
(45) Date of Patent: Dec. 27, 2022

(54) CAGE TRAP DOOR-OPENING ASSEMBLY AND CAGE TRAP WITH THE SAME

(71) Applicant: Woodstream Corporation, Lititz, PA (US)

(72) Inventors: Paul M. Kletzli, Akron, PA (US); Marko K. Lubic, Shillington, PA (US)

(73) Assignee: Woodstream Corporation, Lancaster, PA (US)

( * ) Notice: Subject to any disclaimer, the term of this patent is extended or adjusted under 35 U.S.C. 154(b) by 111 days.

(21) Appl. No.: 16/992,262

(22) Filed: Aug. 13, 2020

(65) Prior Publication Data

US 2022/0046909 A1 Feb. 17, 2022

(51) Int. Cl.
*A01M 23/18* (2006.01)
*A01M 23/08* (2006.01)

(52) U.S. Cl.
CPC ............ *A01M 23/18* (2013.01); *A01M 23/08* (2013.01)

(58) Field of Classification Search
CPC ...... A01M 23/18; A01M 23/08; A01M 23/16; A01M 23/20; A01M 23/02
See application file for complete search history.

(56) References Cited

U.S. PATENT DOCUMENTS

| | | | | |
|---|---|---|---|---|
| 3,750,435 A * | 8/1973 | Belkin | ................... | A24F 15/005 206/265 |
| 4,080,749 A * | 3/1978 | Gilbaugh | .............. | A01M 23/16 43/61 |
| 5,005,312 A * | 4/1991 | Lutes | ..................... | A01M 23/18 43/61 |
| 5,862,624 A * | 1/1999 | Askins | ................... | A01M 23/20 43/60 |
| 6,098,334 A * | 8/2000 | Stouffer | ................. | A01M 23/18 43/61 |
| 6,453,602 B1 * | 9/2002 | Russell | ................... | A01K 69/06 43/44.99 |
| 7,370,451 B2 * | 5/2008 | Rich | ....................... | A01M 23/18 43/67 |
| 7,393,023 B1 * | 7/2008 | Kelly | ................. | G07C 9/00182 292/144 |
| 7,757,427 B2 * | 7/2010 | Bucher | ................. | A01M 23/18 43/61 |
| 7,958,668 B2 * | 6/2011 | Walter | ................... | A01M 23/16 43/60 |

(Continued)

*Primary Examiner* — Timothy D Collins
*Assistant Examiner* — Maria E Graber
(74) *Attorney, Agent, or Firm* — Barley Snyder (57) ABSTRACT

A pre-tensioned door opening assembly and a lock plate releasing mechanism for an animal cage trap having an entry door operative with an animal access opening and a locking mechanism that is engaged upon door closure to prevent the door from being opened by a trapped animal. The pre-tensioned door opening assembly includes a plurality of cable routing elements, and an automatic-return retracting mechanism having a cable. The housing of the automatic-return retracting mechanism is mounted outside the enclosure with the cable being routed through the cable routing elements and operatively coupled with the door. The lock plate releasing mechanism is mounted on the trap roof in functional cooperation with the locking mechanism. The lock plate releasing mechanism disengages the locking mechanism to allow the pre-tensioned door opening assembly to open the entry door of the trap.

17 Claims, 6 Drawing Sheets

(56) References Cited

U.S. PATENT DOCUMENTS

| | | | |
|---|---|---|---|
| 8,104,221 B2 | 1/2012 | Walter et al. | |
| 8,230,641 B2 * | 7/2012 | Rich | A01M 23/18 43/60 |
| 8,359,783 B1 * | 1/2013 | Kamery | A01M 23/20 43/60 |
| 8,776,430 B1 * | 7/2014 | Kamery | A01M 23/20 43/60 |
| 2006/0218849 A1 * | 10/2006 | Rich | A01M 23/18 43/61 |
| 2009/0211146 A1 * | 8/2009 | Radesky | A01M 23/18 43/61 |
| 2009/0307961 A1 * | 12/2009 | Walter | A01M 23/16 43/60 |
| 2016/0135444 A1 * | 5/2016 | Pomerantz | A01M 23/20 43/61 |
| 2017/0202205 A1 * | 7/2017 | Wu | A01M 23/18 |

* cited by examiner

CAGE TRAP DOOR-OPENING ASSEMBLY AND CAGE TRAP WITH THE SAME

BACKGROUND OF THE INVENTION

Field of the Invention

This invention relates to cage-type animal traps of the kind generally used outdoors for trapping small to medium sized animals without harming the trapped animal.

Description of the Related Art

Cage-type traps generally include a cage of metal wire mesh or the like with a door held open by a trigger mechanism until an animal is lured into the trap by suitable pre-inserted bait. After the animal enters the interior of the trap, the animal's weight pressed against the trigger actuates a trip which releases the door, allowing the door to close, thereby trapping the animal inside the cage. The animal is then typically relocated and released by opening the door.

According to one highly effective style of known trap, disclosed in U.S. Pat. No. 5,862,624 ("the '624 patent"), a locking component is provided that serves to prevent the animal from opening the door from the inside. The '624 patent is owned by the assignee of the instant application and is hereby incorporated by reference as if fully set forth herein in its entirety.

To release an animal trapped in a cage like that disclosed in the '624 patent, the locking component must be disengaged and the door manually opened. These steps generally require the use of two hands and involve close contact with the animal. When releasing a potentially dangerous animal, the need to be immediately adjacent the trapped animal and to use two hands to physically open the trap as described in the '624 patent may subject the user to an unacceptably close encounter when the animal exits the trap.

To allow for animal release without the user being in close proximity, cage traps such as those disclosed in U.S. Pat. Nos. 7,958,668 and 8,104,221 have been developed that have an entry door and a secondary escape door. The escape door operates with a time release mechanism that, after a preset time delay, opens the escape door to allow the animal to escape therethrough while the entry door remains closed. However, including a secondary escape door increases both the complexity of the trap, and the number of possible routes through which a trapped animal may be able to effect an unintended escape, e.g., such as before being relocated and intentionally released.

U.S. Pat. No. 8,359,783 ("the '783 patent") discloses a cage trap having an over-center set lever with a remote-controlled door opening mechanism that can be used on either the main entry door or, when the cage trap is so equipped, on a secondary escape door. The door opening mechanism includes a cable connected to the door and a cable retracting mechanism. While the door opening mechanism disclosed in the '783 patent can open the main entry door after the user has reached a safe distance from the trap, the over-center set lever does not include a locking component of the type shown in the '624 patent that must be lifted before the door can be pulled opened. Therefore, while the cable retracting mechanism described in the '783 patent could potentially be used with other trap designs with appropriate changes in the routing of the cable, there is still no provision for dealing with the locking component of a trap like that in the '624 patent. The '783 patent is also owned by the assignee of the instant application and is hereby incorporated by reference as if fully set forth herein in its entirety.

There is thus a need for a mechanism by which a cage trap having an entry door with a locking component that prevents the animal from opening the trap from the inside, such as that disclosed in the '624 patent, may be opened after the user has withdrawn to a safe distance so that the user can easily release a trapped animal without subjecting the user to close contact with the trapped animal.

SUMMARY OF THE INVENTION

The present invention is therefore directed to a cage trap door opening assembly for use with a cage-type animal trap having an entry door. The trap has a wire mesh animal enclosure made up of a base, a pair of opposed sidewalls emanating from the base, a rear wall secured to the sidewalls and the base, a roof secured to the tops of the sidewalls and the rear wall, and a front end provided with an animal access opening defined by the base, sidewalls, and roof. As used in connection with the single entry door trap disclosed herein, "front" and "forward" refer to the end of the trap having the entry door, while "rear" and "rearward" refer to elements of the trap and/or a movement made relative to and away from the front of the trap and toward the rear wall thereof.

The entry door is movably mounted at the front end of the trap and operates in an opened position to reveal the animal access opening and in a closed position to block the animal access opening. The animal access opening is defined as that opening through which an animal enters the trap enclosure when the trap is in use, having been set with the door in the opened position. The entry door is held in its opened position by a hook or trigger that is pivotally mounted on the roof and that engages with the door when set, in a manner like that disclosed in the '624 patent. The door is pivotally mounted along its upper edge to the roof of the trap. As used herein, "door" and "entry door" are used interchangeably and refer to the same structure, namely the blocking element that closes off the animal access opening to contain an animal caught within the trap enclosure when the trap has been tripped and such blocking element has moved to its closed position.

The trap according to the present invention includes a locking mechanism that prevents an animal trapped therein from opening the door from the inside, similar to that disclosed in the '624 patent. More specifically, the locking mechanism of the present invention includes a wire yoke and a lock plate. The wire yoke has an upper bar formed integrally with two extending arms having lower ends that are pivotally captured within loops on the lower edge of the door. The yoke is spring-tensioned to rapidly move the door to the closed position and resist opening thereof in the same manner as set forth in the '624 patent.

When the door is moved to the opened position, the upper bar of the wire yoke slides rearwardly, adjacent the roof of the trap, to bring the wire yoke into a generally parallel relationship with the roof when the trap is set. When the trap is tripped, the upper bar of the yoke slides forwardly to reach a forward-most position adjacent the front top edge of the trap. Upon reaching this position, the lock plate, which is mounted on the roof of the cage, drops down to block the upper bar of the wire yoke from sliding rearwardly along the roof in response to pressure applied against the inside of the door by the trapped animal.

The lock plate must be lifted out of engagement with the wire yoke before the door can be pulled upwardly to allow the animal to exit the trap through the animal access opening, similar to the drop latch in the '624 patent. However, according to the present invention, this lifting action is accomplished using a lock plate releasing mechanism. The lock plate releasing mechanism is preferably embodied as a mechanical timed-release mechanism that is operative with a pre-tensioned door opening assembly. After a predetermined time delay, the timed-release mechanism lifts the lock plate out of the way of the yoke which enables the pre-tensioned door opening assembly to open the door without any action by the user. The animal can then exit the trap through the same animal access opening through which the animal entered the trap before being caught therein.

More particularly, the pre-tensioned door opening assembly includes a plurality of cable routing elements, preferably pulleys, mounted to the trap, and an automatic-return retracting mechanism that is removably attached to the trap as needed. According to one preferred embodiment, the plurality of pulleys includes three pulleys mounted to the roof of the trap and a fourth pulley mounted on or near the lower end of the door. The automatic-return retracting mechanism has a cable wound on an inner spool that is tensioned by a torsion/clock spring, or the like. When the cable is pulled out by a force and then released, the torsion/clock spring acts to retract the cable back onto the spool.

To use the pre-tensioned door opening assembly to open the trap after the trap has been tripped, the housing of the automatic-return retracting mechanism is mounted on the roof of the trap. The cable is pulled out against the mechanism's spring tension and routed through the pulleys, with the free end of the cable being secured to the upper bar of the wire yoke. During this mounting process the lock plate provides a stop that prevents rearward sliding movement of the yoke in response to the tension on the cable and/or pressure applied to the inner side of the door by the trapped animal attempting to push the door open.

The user then sets the timed-release mechanism for a desired time delay as deemed necessary for the user to withdraw to a safe distance from the trap, and the user then moves to such distance. Upon expiration of the time delay, the timed-release mechanism acts to lift the lock plate. With the lock plate out of the way, the upper bar of the yoke is free to slide rearwardly adjacent the roof to allow the door to be pulled to the opened position in response to the force applied by the automatic-return retracting mechanism. In particular, the cable is retracted onto the spool by the stored energy in the wound tension spring of the automatic-return retracting mechanism. Thus the door is opened automatically to allow the animal inside the trap to escape while the user remains at a safe distance.

In a second embodiment, the lock plate releasing mechanism may be embodied with an electronic component that is responsive to a remote control unit. A representative release mechanism that is remotely controlled is disclosed in the '783 patent previously incorporated by reference herein. In the instant invention, however, there is only a single door and therefore the lock plate releasing mechanism is operative to lift the lock plate in a manner like that utilized with the timed-release mechanism.

Accordingly, it is an object of the present invention to provide a pre-tensioned door-opening assembly and lock plate releasing mechanism for a cage trap that has an entry door operative to alternately expose and cover an animal access opening and a locking mechanism that prevents the animal from opening the entry door from the inside once the door is closed, the locking mechanism including a wire yoke and a lock plate, the lock plate releasing mechanism configured to lift the lock plate, either after a time delay or remotely using a control unit, to release the wire yoke and enable the pre-tensioned door-opening assembly to pull the door open without requiring the user to have physical contact with the trap, the animal then exiting the trap through the animal access opening.

Another object of the present invention is to provide a pre-tensioned door-opening assembly and lock plate releasing mechanism for a cage trap having a single entry door in accordance with the preceding object that is operative to open the door after a user-selected time delay that enables the user to reach a safe distance from the trap before the trap opens or in response to a remote signal sent by the user from such safe distance.

Yet another object of the present invention is to provide a pre-tensioned door-opening assembly and timed-release mechanism for a cage trap having a single entry door in accordance with the preceding objects in which the lock plate releasing mechanism is a timed-release mechanism and the pre-tensioned door-opening assembly includes a plurality of cable routing elements, preferably pulleys, mounted to the roof of the trap and on the door, and an automatic-return retracting mechanism with a cable, the cable being routed through the pulleys so that the automatic-return retracting mechanism pre-tensions the door, and the timed-release mechanism being operative after a time delay to lift the lock plate to allow the door to be pulled open by the automatic-return retracting mechanism.

Still another object of the present invention is to provide a pre-tensioned door-opening assembly and timed-release mechanism for a cage trap having a single entry door in accordance with the preceding object in which the door of the trap is biased to the closed position by the wire yoke under spring tension, an upper bar of the yoke sliding forwardly adjacent the roof of the trap when the trap is tripped to reach a forwardmost position once the door is closed, the lock plate dropping down to block the upper bar of the yoke from rearward movement to prevent the door from being opened by an animal inside the trap, the timed-release mechanism including a magnet that is exposed after a set time delay to magnetically pull the lock plate upwardly to release the yoke and allow the automatic-return retracting mechanism to pull the door open.

A further object of the present invention is to provide a pre-tensioned door-opening assembly and timed-release mechanism for a cage trap having a single entry door in accordance with the preceding two objects in which the plurality of pulleys includes a roof edge pulley mounted on the front roof edge bar of the trap at the entrance opening, first and second roof pulleys mounted on the roof in longitudinally spaced relationship rearward of the roof edge pulley, and a door pulley mounted adjacent to the lower end of the door, the roof edge pulley being mounted in substantially vertical alignment with the door pulley, the cable being pulled out of the automatic-return retracting mechanism and routed forwardly over the roof edge pulley, downwardly and then over the door pulley, rearwardly and then over the second roof pulley, forwardly and under the first roof pulley and then secured at its free end to the upper bar of the yoke.

Yet a further object of the present invention is to provide a pre-tensioned door-opening assembly and lock plate releasing mechanism for a cage trap having at least one entry door in accordance with at least one of the preceding objects in which the automatic-return retracting mechanism can be easily attached to and then removed from the cage trap as an accessory, allowing the same mechanism to be moved from one trap to another for opening the respective entry door thereof.

A still further object of the present invention is to provide a pre-tensioned door-opening assembly and lock plate releasing mechanism for a cage trap having at least one entry door in accordance with at least one of the preceding objects that can be retrofit onto existing cage traps.

Another object of the present invention is to provide a pre-tensioned door-opening assembly and lock plate releasing mechanism for a cage trap having an entry door in accordance with the first or second object above in which the lock plate releasing mechanism is a remotely controlled release mechanism, and the pre-tensioned door-opening assembly includes a plurality of cable routing elements, preferably pulleys, mounted to the roof of the trap and on the door, and an automatic-return retracting mechanism with a cable, the cable being routed through the pulleys so that the automatic-return retracting mechanism pre-tensions the door, and the remotely controlled release mechanism being operative to lift the lock plate to allow the door to be pulled open by the automatic-return retracting mechanism in response to a signal sent by a user having a remote control device.

Still another object of the present invention is to provide a pre-tensioned door-opening assembly and lock plate releasing mechanism for a cage trap having an entry door in accordance with the preceding objects that is relatively simple in design while providing durable mechanical operation, and which can be manufactured from readily available components and in a cost-effective manner.

Yet another object of the present invention is to provide a pre-tensioned door-opening assembly and lock plate releasing mechanism for a cage trap having a single entry door operative to alternately expose and cover an animal access opening, the trap having no other doors or animal access openings.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE PREFERRED EMBODIMENTS

It is to be understood that the embodiments described herein are disclosed by way of illustration only. It is not intended that the invention be limited in its scope to the details of construction and arrangement of components set forth in the following description or illustrated in the drawings. Also, in describing the preferred embodiments, specific terminology will be resorted to for the sake of clarity. It is to be understood that each specific term includes all technical equivalents which operate in a similar manner to accomplish a similar purpose.

Figure 1:
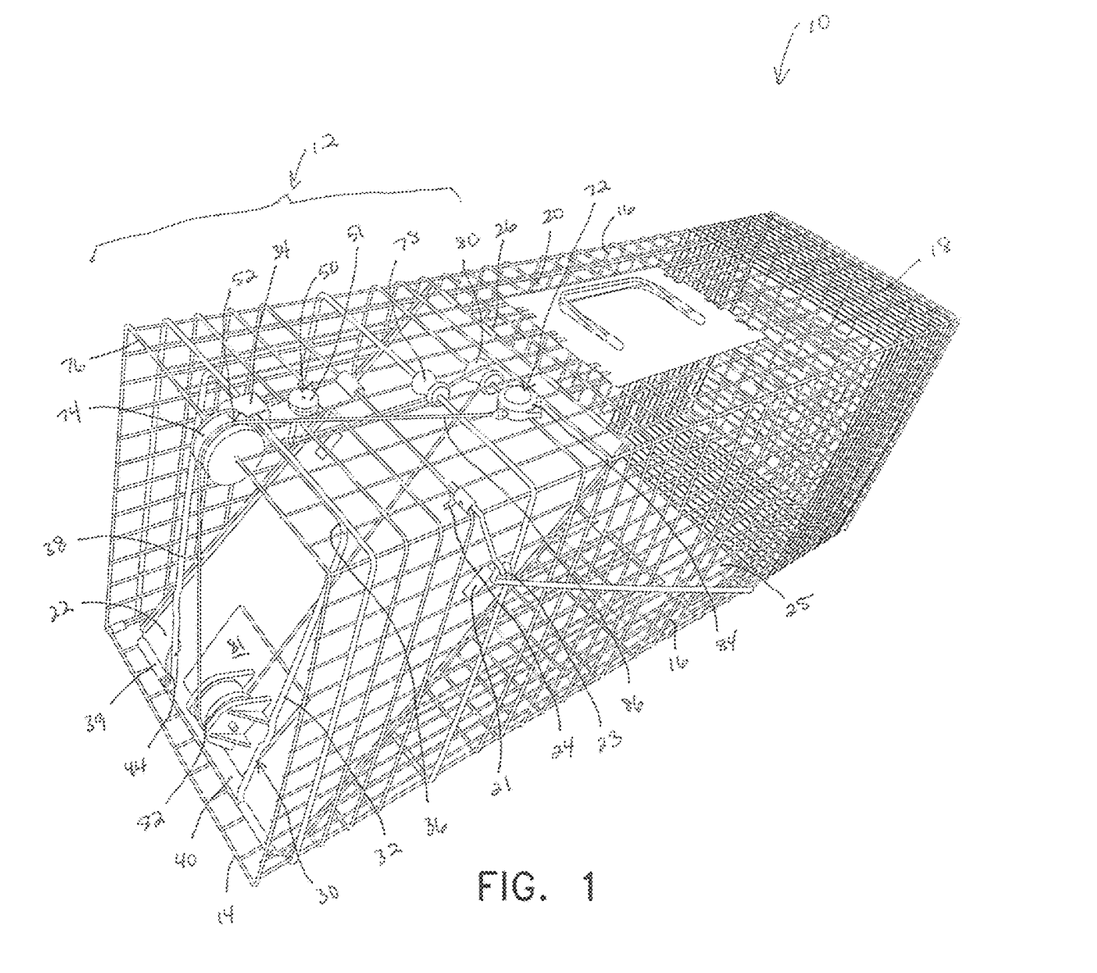
FIG. 1 is a perspective view of an animal trap having a pre-tensioned door opening mechanism and a lock plate releasing mechanism embodied as a timed-release mechanism in accordance with a first embodiment of the present invention.

As shown in FIG. 1, the present invention is directed to a cage trap generally designated by reference numeral 10 and having a pre-tensioned door-opening assembly and lock plate releasing mechanism generally designated by reference numeral 12.

The trap 10 has a wire mesh animal enclosure made up of a base 14, a pair of opposed sidewalls 16 emanating from the base, a rear wall 18 secured to the sidewalls and the base, a roof 20 secured to the tops of the sidewalls and the rear wall, and an animal access opening equipped with an entry door 22. According to the preferred embodiment shown, the trap has a single entry door 22 and no other doors through which an animal may enter or exit the trap.

The entry door 22 is movably mounted at the front end of the trap and operates in an opened position to reveal the animal access opening and in a closed position to block the animal access opening. The door 22 is held in its open position by a hook or trigger 24 that is pivotally mounted on the roof 20 and that engages with the door when set, in a manner like that disclosed in the '624 patent. The door 22 is pivotally mounted along its upper edge 26 to the roof 20 of the trap. The rearward end of the trigger 24 is connected through linkage 23 to a trigger plate 25. As with the trap described in the '624 patent, an animal applying pressure to the trigger plate 25 "trips" the trap by disengaging the trigger 24 from the door aperture 21 (see FIG. 1), allowing the door to pivot to the closed position.

The trap 10 is provided with a locking mechanism generally designated by reference numeral 30 that prevents an animal trapped therein from opening the entry door from the inside. The locking mechanism 30 includes a wire yoke 32 and a lock plate 34. The wire yoke 32 has an upper bar 36 formed integrally with two arms 38 that extend at substantially right angles to the upper bar. The lower ends of the arms are pivotally captured within loops 39, or similar structures allowing rotational movement, on the lower end 40 of the door.

When the door is moved to the opened position, the upper bar 36 of the wire yoke 32 slides rearwardly, adjacent the roof 20 of the trap, to bring the wire yoke into a generally parallel relationship with the roof when the trap is set as in the '624 patent. The door 22 is kept in the opened position by engagement thereof with the trigger 24 as known from the '624 patent.

The yoke 32 is tensioned by a spring 44 to bias the door to the closed position. When the trap is tripped, the door 22 rotates downwardly to the closed position, blocking the animal access opening, with the upper bar 36 of the yoke 32 sliding forwardly to reach a forwardmost position when the door is closed as shown in FIG. 1. The lock plate 34 is mounted on the roof 20 of the cage trap 10 and, once the yoke upper bar has reached its forwardmost position, drops down to block the upper bar of the wire yoke from sliding rearwardly along the roof (best shown in FIG. 7) in response to pressure applied against the inside of the door by the trapped animal.

To release the animal, the lock plate 34 must be lifted out of engagement with the yoke 32 before the door 22 can be pulled upwardly. To accomplish this lifting action the trap includes a lock plate releasing mechanism generally designated by reference numeral 50, preferably embodied as a timed-release mechanism 51. The timed-release mechanism 51 is operative with a pre-tensioned door opening assembly generally designated by reference numeral 52 as shown in the enlarged partial views of FIGS. 2 and 3. The timed-release mechanism 51 lifts the lock plate 34 after a predetermined time delay, enabling the pre-tensioned door opening assembly 52 to open the entry door without any action by the user.

The timed-release mechanism 51 is preferably mechanical in design. Alternatively, the timed-release mechanism may be electrically or electronically controlled, or may be configured with a combination of mechanical, electrical and/or electronic components.

According to a first embodiment shown particularly in FIGS. 4-7, the lock plate releasing mechanism 50 embodied as the timed-release mechanism 51 includes an upper housing 54, a lower housing 56 with a cutout 58, and a magnet 60 which is mounted on a lower surface 55 of the upper housing. The upper and lower housings, which are generally disk-shaped and stacked with the upper housing on top of the lower housing with the magnet 60 therebetween, are rotatably movable relative to one another against the bias of a spring (not shown) such that, when the upper housing is wound relative to the lower housing and then released, the spring bias acts to unwind the upper housing to a point of equilibrium. At the point of equilibrium, the magnet 60 comes into alignment with the cutout 58 in the lower housing 56, exposing the magnet on the lower side of the timed-release mechanism. To cover the magnet 60 when the timed-release mechanism is not in use, the upper housing 54 is configured to allow advancement past the point of equilibrium to place the magnet 60 into an unaligned position with respect to the cutout 58 in the lower housing 56.

Figure 7:
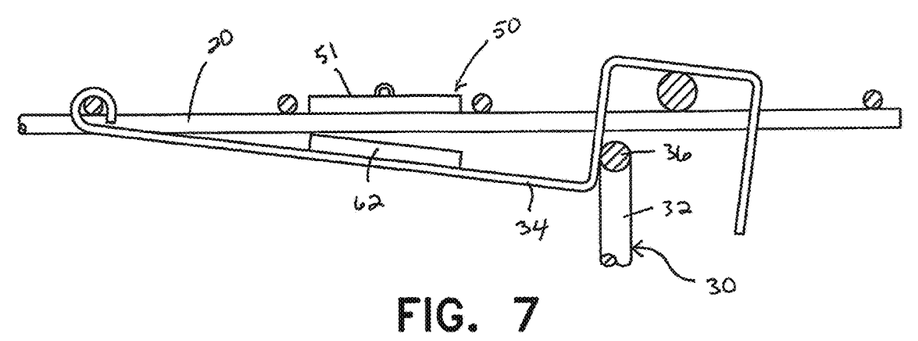
FIG. 7 is a representative partial side view of the timing device shown in FIG. 4 as mounted on the trap (not to scale).

Prior to operation, the timed-release mechanism 51 is mounted on the roof 20 of the trap 10 above the lock plate 34 with the magnet 60 in the unaligned position relative to the cutout 58. The lock plate 34 is made of a magnetic material or is provided with a magnet 62 mounted on the upper surface of the lock plate 34 (see FIG. 7). With the magnet 60 of the mechanism 51 out of alignment with the cutout 58, the lock plate 34 is not acted upon by the magnet 60 and is operative to drop down and block rearward movement of the wire yoke once the door has been closed as shown in FIGS. 1 and 7.

To activate the timed-release mechanism 51, the user rotates the upper housing 54 counter-clockwise (or clockwise) relative to the lower housing 56 to store energy within the spring (not shown). Once the upper housing is released, the upper housing rotates clockwise (or counter-clockwise) under the spring bias, unwinding over a period of time that enables the user to reach a place of safety remote from the trap. When the upper and lower housings reach the point of equilibrium with the magnet 60 aligned with the cutout 58, the magnet 60 is exposed and magnetically attracts the lock plate 34, or the magnet 62 thereon, lifting the lock plate to release the wire yoke 32. Once the lock plate has been lifted, the pre-tensioned door opening assembly 52 is engaged as will now be described.

Figure 2:
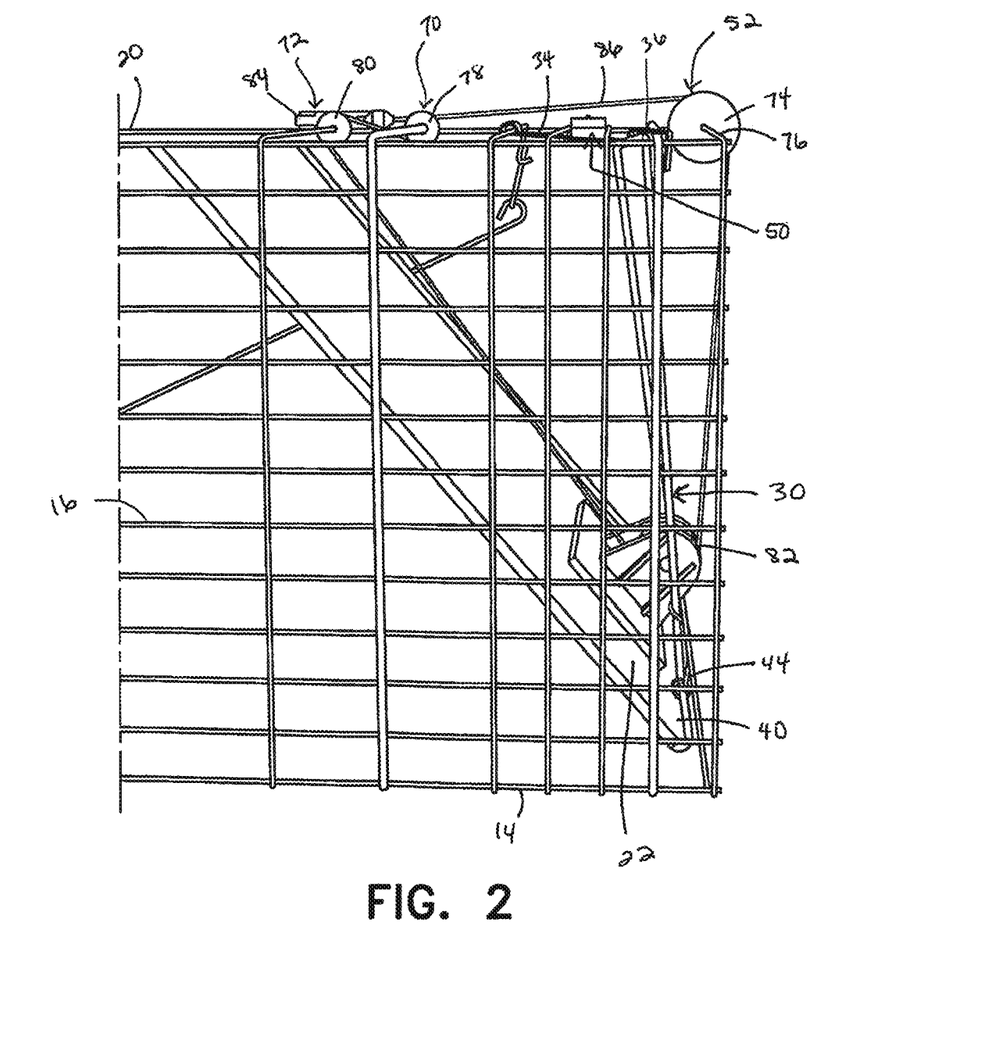
FIG. 2 is a partial cut-away side perspective view showing the front end of the animal trap shown in FIG. 1.
Figure 3:
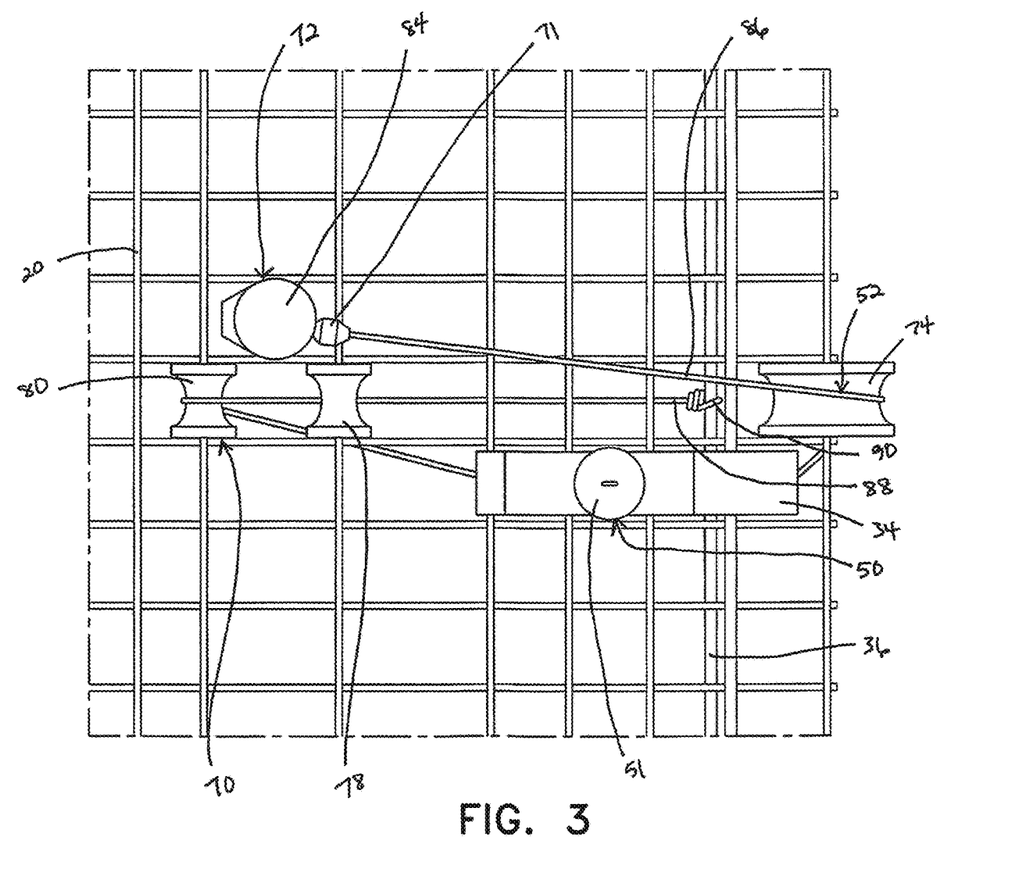
FIG. 3 is a top view of the pre-tensioned door opening mechanism and timed-release mechanism of the trap shown in FIG. 1.
Figure 4:
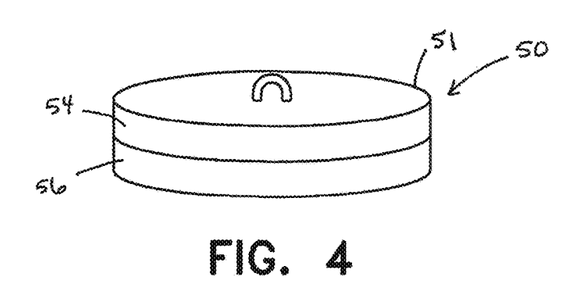
FIG. 4 is a perspective view of a representative timing device for use within the timed-release mechanism in accordance with the present invention.
Figure 5:
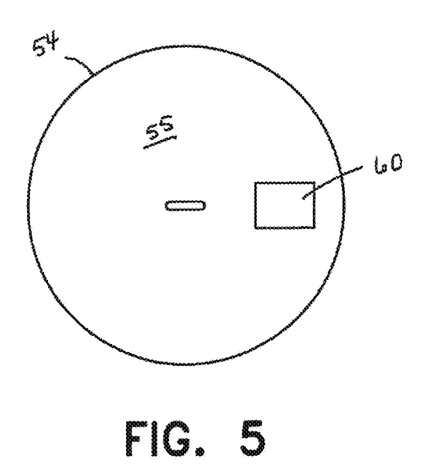
FIG. 5 is a bottom plan view of the upper housing of the timing device shown in FIG. 4.
Figure 6:
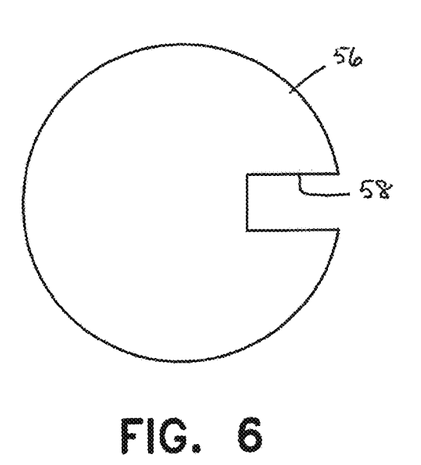
FIG. 6 is bottom plan view of the lower housing of the timing device shown in FIG. 4.

As shown in FIGS. 1-3, the pre-tensioned door opening assembly 52 includes a plurality of cable routing elements generally designated by reference numeral 70, and an automatic-return retracting mechanism generally designated by reference numeral 72. The cable routing elements may be embodied as a plurality of pulleys which are mounted to the trap. According to one preferred embodiment, the plurality of pulleys includes a roof edge pulley 74 mounted on the front roof edge bar 76 of the trap at the animal access opening, a first roof pulley 78 mounted rearwardly of and longitudinally spaced from the roof edge pulley 74, a second roof pulley 80 mounted on the roof rearwardly and in longitudinally spaced relationship with the first roof pulley 78, and a door pulley 82 mounted on the lower end 40 of the door 22. The roof edge pulley 74 is mounted in substantially vertical alignment with the door pulley 82.

Figure 8A:
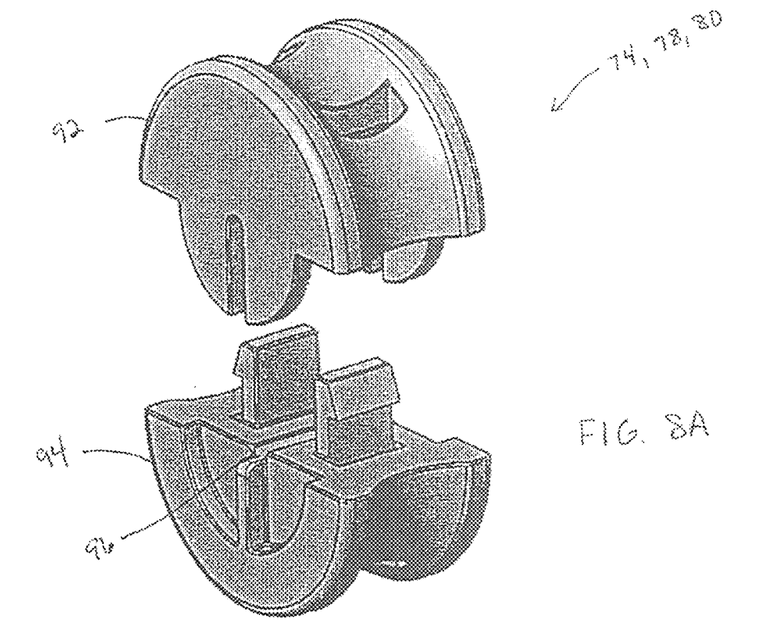
FIG. 8A is a perspective exploded view of a pulley like those shown in FIG. 1.
Figure 8B:
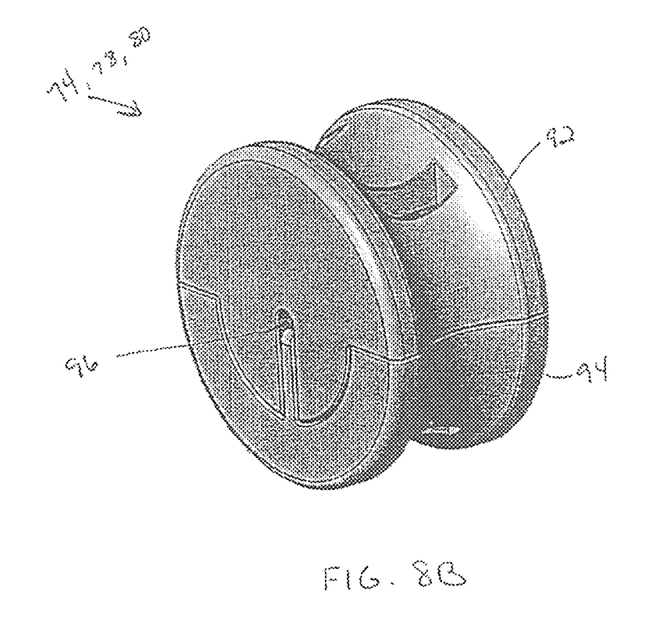
FIG. 8B is an assembled view of the two parts of the pulley shown in FIG. 8A.

The door pulley 82 is preferably formed, such as by injection molding, with a mounting base plate 81 (see FIG. 1) that is secured to the door using screws (not shown). Alternatively, the base plate 81 may be affixed to the door using rivets, adhesive or the like as would be understood by persons of ordinary skill in the art. The first and second roof pulleys 78, 80 and the roof edge pulley 74 are preferably molded to include a first piece 92 and a second piece 94 as shown in the exploded view of FIG. 8A. The first and second pieces 92, 94 are configured to be joined to one another with a snap fit that locks the pieces together as shown in FIG. 8B. Once joined, the two pieces 92, 94 define a channel 96 within which a selected roof bar of the trap 10 is captured when the pulley has been mounted to the roof. It is noted that as shown in FIGS. 1-3, the first and second roof pulleys 78, 80 are preferably the same size while the roof edge pulley 74 is larger. However, for the purposes of FIGS. 8A and 8B as being representative, the same construction applies to all three pulleys, regardless of differences in their individual sizes.

The automatic-return retracting mechanism 72 has a housing 84 with an inner spool (not shown) upon which a cable 86 is wound. The inner spool is tensioned by a torsion/clock spring (not shown), or the like, so as to retract the cable 86 back onto the spool after the cable has been pulled out. The extendible free end 88 of the cable is preferably provided with a fastener 90 (see FIG. 3) which may be embodied as a clip, such as a carbineer style clamp, or as simply a tied "fastener", by which the extendible end of the cable may be secured to the upper bar 36 of the yoke 32 of the trap. The automatic-return retracting mechanism 72 of the pre-tensioned door opening assembly 52 may be embodied by a commercially available retractor such as the Automatic-Return Hanging Retractor, Item number 7433A16, sold by the MCMASTER-CARR® Supply Company. The MCMASTER-CARR® retractor may include an adjustable cable stop 71, but this cable stop 71 is not necessary to the operation of the present invention.

To use the automatic-return retracting mechanism 72 to open the trap door, the housing 84 is mounted to the roof 20 of the trap. The housing preferably includes an attachment element (not shown) for this purpose which may be embodied as a sliding clip element, a carbineer style clamp, or as any other suitable clamp or fastening mechanism as would be understood by persons of ordinary skill in the art.

With the housing 84 mounted on the trap roof 20, the cable 86 is pulled out against the tension of the return mechanism spring and routed through the pulleys with the free end 88 of the cable being secured to the wire yoke. More particularly, the cable is routed forwardly to and then downwardly over the roof edge pulley 74, downwardly to and over the door pulley 82, rearwardly and upwardly to and over the second roof pulley 80, forwardly and under the first roof pulley 78 and then secured at its free end 88 to the upper bar 36 of the locking yoke 32. In this configuration, the lock plate 34 blocks the yoke upper bar from being moved rearwardly and thereby prevents the door from being opened.

With the automatic-return retracting mechanism thus assembled to the trap with the cable routed through the pulleys as just described, the timed-release mechanism 51 is set for a desired time delay as deemed necessary for the user to withdraw to a safe distance from the trap, and the user moves to such distance. Upon expiration of the time delay, the timed-release mechanism acts to lift the lock plate. With the lock plate out of the way, rearward movement of the yoke is no longer blocked and the spool of the automatic-return retracting mechanism is free to spin and thereby retract the cable onto the spool by the stored energy therein. The retraction of the cable pulls the entry door to the opened position without intervention by the user, allowing the animal inside the trap to escape through the animal access opening while the user remains at a safe distance away from the trap.

Figure 9:
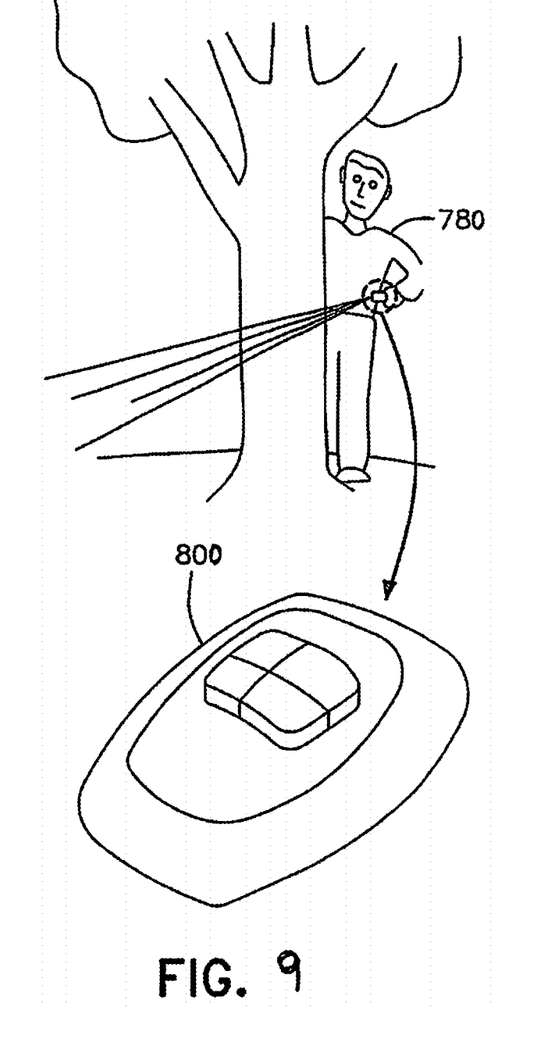
FIG. 9 is an illustration showing a user activating the lock plate releasing mechanism from a safe distance using a remote control unit in accordance with a second embodiment of the present invention.

According to a second embodiment, the lock plate releasing mechanism may include electronic components (not shown) that are controlled by a remote control unit 800 as shown in FIG. 9. The user 780 with the remote control unit 800 can activate the lock plate releasing mechanism from a safe distance in like manner to the operation described in the '783 patent. However, the mechanical design in accordance with the first embodiment is preferred. A remote-controlled mechanism could include an electrical component such as an electromagnet, a solenoid, or a motor the raise the locking mechanism when the user activates the remote control unit as would be understood by persons of ordinary skill in the art.

As described herein, the pre-tensioned automatic retracting mechanism is an independent accessory that can be easily attached to and then removed from any existing cage trap designed with a locking yoke of the type set forth in greater detail in the '624 patent. Because it is removable, a single automatic retracting mechanism may be used to sequently open a plurality of traps, reducing the manufacturing cost of each individual trap.

While disclosed in connection with a cage trap having a single entry door, the pre-tensioned door opening assembly 52 of the present invention may also be used on a cage trap having two opposed entry doors, such as the HAVAHART® Model 1045 two-door live animal cage trap. When used with a trap having two entry doors, at least one of the doors is provided with the plurality of cable routing elements 70, and the automatic-return retracting mechanism is mounted to operate with these routing elements 70 as activated by a timed-release mechanism in like manner as already described herein in connection with the single entry door trap. Whether the trap has one or two entry doors, however, the traps to which the present invention is directed do not include a secondary escape door that is separate from the entry door(s) and used only for animal release.

Accordingly, the present invention provides a door-opening mechanism that is easy to use and which, through the timed release opening capability, allows the user to maintain a safe distance from the trap when releasing a trapped animal.

It is to be understood that the present invention is not limited to the illustrated embodiments described herein. Modifications and variations of the above described embodiments of the present invention are possible as appreciated by those skilled in the art in light of the above teachings.

What is claimed is:

1. An animal trap comprising:
   an animal enclosure having a roof and a front end with an access opening in communication with a vacant interior sized to receive an animal to be trapped;
   a door movably mounted at the access opening, the door operative in an opened position to reveal the access opening and in a closed position to block the access opening;
   a trigger mechanism for setting the trap;
   a trigger plate for releasing the trigger mechanism to allow the door to close;
   a pre-tensioned door opening assembly mounted on the trap and operatively engaged with the door;
   a locking mechanism engaged when the door is in the closed position to prevent the door from being opened by an animal from inside the animal trap, said locking mechanism also preventing said pre-tensioned door opening assembly from opening the door until said locking mechanism is disengaged, said locking mechanism includes a locking wire yoke mounted on a lower edge of the door and a lock plate mounted on the roof, the locking wire yoke having an upper bar that slides rearwardly adjacent the roof when the door is moved to the opened position, the lock plate engaging with said upper bar to block said rearward sliding when the door has moved to the closed position; and
   a lock plate releasing mechanism configured to disengage the locking mechanism to allow said pre-tensioned door opening assembly to pull the door open, said lock plate releasing mechanism acting to lift the lock plate to a non-blocking position with respect to the upper bar of the locking wire yoke, allowing the pre-tensioned door opening assembly to open the door.

2. The animal trap of claim 1, wherein the door is a single entry door and the animal trap has no other doors.

3. The animal trap of claim 1, wherein the lock plate releasing mechanism is remotely controlled by a user with a remote control unit.

4. The trap of claim 1, wherein the door is a single door and the trap has no other doors.

5. The animal trap of claim 1, wherein the lock plate releasing mechanism is a timed-release mechanism that disengages the locking mechanism after a time delay set by a user at the trap.

6. The animal trap of claim 5, wherein said timed-release mechanism acts to lift the lock plate to non-blocking position with respect to the upper bar of the locking wire yoke after the time delay.

7. The animal trap of claim 6, wherein said pre-tensioned door opening assembly includes a plurality of cable routing elements mounted on the animal trap and an automatic-return retracting mechanism mounted to the animal trap roof outside said animal enclosure and rearwardly of the access opening, said automatic-return retracting mechanism including a cable directed by the cable routing elements, a free end of said cable being coupled to said locking wire yoke upper bar.

8. The animal trap of claim 7, wherein said plurality of cable routing elements includes a plurality of pulleys.

9. The animal trap of claim 8, wherein said plurality of pulleys includes a door pulley mounted on a lower end of the door and first, second and third roof pulleys, said free end of said cable being run over the first roof pulley, then directed downwardly to pass over the door pulley, then directed upwardly and rearwardly to run over the second roof pulley, then forwardly to run under the third roof pulley, and then said free end being secured to the upper bar of the locking wire yoke.

10. An animal trap comprising:
an animal enclosure having a roof and a front end with an access opening into a vacant interior sized to receive an animal to be trapped;
a single entry door movably mounted at the access opening, the door operative in an opened position to reveal the access opening and in a closed position to block the access opening, the animal trap having no other doors through which an animal can enter or exit the animal trap other than the single entry door;
a trigger mechanism for setting the trap;
a trigger plate for releasing the trigger mechanism to allow the door to close;
a pre-tensioned door opening assembly mounted on the animal trap and operatively engaged with the single entry door, said pre-tensioned door opening assembly including an automatic-return retracting mechanism with a cable that is routed through a plurality of pulleys mounted on the animal enclosure and the single entry door;
a locking mechanism engaged when the single entry door is in the closed position to prevent the single entry door from being opened by an animal from inside the animal trap, said locking mechanism also preventing said pre-tensioned door opening assembly from opening the single entry door until said locking mechanism is disengaged, said locking mechanism including a locking wire yoke pivotally mounted on a lower edge of the single entry door and a lock plate mounted on the roof of the animal trap, the locking wire yoke having an upper bar that slides rearwardly adjacent the roof when the single entry door is moved to the opened position, the lock plate engaging with said upper bar to block said rearward sliding when the single entry door has moved to the closed position;
a lock plate releasing mechanism configured to disengage the lock plate to allow said pre-tensioned door opening assembly to pull the single entry door open by retracting the cable as routed over the plurality of pulleys.

11. The animal trap of claim 10, wherein the lock plate releasing mechanism is a timed-release mechanism that lifts the lock plate out of engagement with the upper bar of the wire yoke after a time delay.

12. The animal trap of claim 10, wherein the lock plate releasing mechanism is a remotely controlled mechanism that lifts the lock plate out of engagement with the upper bar of the wire yoke in response to a signal sent by a remote control unit.

13. The animal trap of claim 10, wherein said plurality of pulleys includes a door pulley mounted on a lower end of the single entry door and first, second and third roof pulleys, said free end of said cable being run forwardly over the first roof pulley, then directed downwardly to pass over the door pulley, then directed upwardly and rearwardly to run over the second roof pulley, then forwardly to run under the third roof pulley, and then said free end being secured to the upper bar of the locking wire yoke.

14. The animal trap of claim 10, wherein said automatic-return retracting mechanism is removable for use on another trap that is equipped with a plurality of pulleys.

15. A trap comprising: an enclosure having a roof and a front end with an access opening into a vacant interior sized to receive an animal to be trapped; a door movably mounted at the access opening, the door operative in an opened position to reveal the access opening and in a closed position to block the access opening; a trigger mechanism for setting the trap and including a hook; a trigger plate operatively connected to the trigger mechanism via a linkage for releasing the trigger mechanism to allow the door to close; a pre-tensioned door opening assembly mounted on the trap and operatively engaged with the door;
a locking mechanism including a locking wire yoke engaged when the door is in the closed position to prevent the entry door from being opened by an animal from inside the trap, the locking mechanism preventing the pre-tensioned door opening assembly from opening the door until the locking mechanism is disengaged; wherein the locking wire yoke is rigid and is attached to the door proximate a first end thereof; wherein the locking mechanism further includes a lock plate mounted on the roof of the trap; a lock plate releasing mechanism configured to disengage the locking mechanism to allow the pre-tensioned door opening assembly to pull the door open; and wherein a second end of the locking wire yoke selectively engages with the lock plate releasing mechanism.

16. The trap of claim 15, wherein the locking wire yoke includes an upper bar that slides rearwardly adjacent the roof when the door is moved to the opened position.

17. The trap of claim 16, wherein the lock plate engages with the upper bar to block the rearward sliding when the door has moved to the closed position, the lock plate releasing mechanism lifting the lock plate to a non-blocking position with respect to the upper bar of the locking wire yoke, allowing the pre-tensioned door opening assembly to open the door.

* * * * *